March 5, 1940.    F. L. SCOTT    2,192,697
CUTTER MOUNTING
Filed Dec. 27, 1938

Floyd L. Scott
INVENTOR
BY Jesse R. Stone
ATTORNEY

Patented Mar. 5, 1940

2,192,697

UNITED STATES PATENT OFFICE 2,192,697

CUTTER MOUNTING

Floyd L. Scott, Houston, Tex., assignor to Hughes Tool Company, Houston, Tex., a corporation of Delaware Application December 27, 1938, Serial No. 247,742

4 Claims. (Cl. 255—71)

The invention pertains to cutters for well drills and more particularly to means for mounting the cutter upon the shaft upon which it rotates.

In well drills of the cone type wherein the toothed cutters are mounted to surround and enclose the end of the shaft, means must be provided to engage the cutter rotatably upon the shaft so as to prevent its removal from the shaft particularly when the bit is being moved upwardly in the well. A common way of doing this is to employ a row of balls fitting in opposing grooves in the cutter and the shaft, said balls being inserted into said groove through a bore in the shaft from the outside of the head. However, in the smaller sizes of drills this means is not desirable because of the lack of space.

It is an object of this invention to provide a retaining means for drill cutters which permits of free rotation of the cutter and which automatically engages the cutter upon its bearing in the assembly of the cutter upon the shaft.

It is a further object to provide a bearing for the forward end of the cutter which is adapted to wear for long periods of time so that the bearing will last as long in use as do the cutting teeth upon the surface of the cutter.

I seek to provide a bearing member between the cutter shell and the shaft to which the cutter may lock to prevent removal of the cutter from the shaft.

The invention resides particularly in the construction of the rotatable bushing and the means for securing the cutter thereto.

Figure 1:
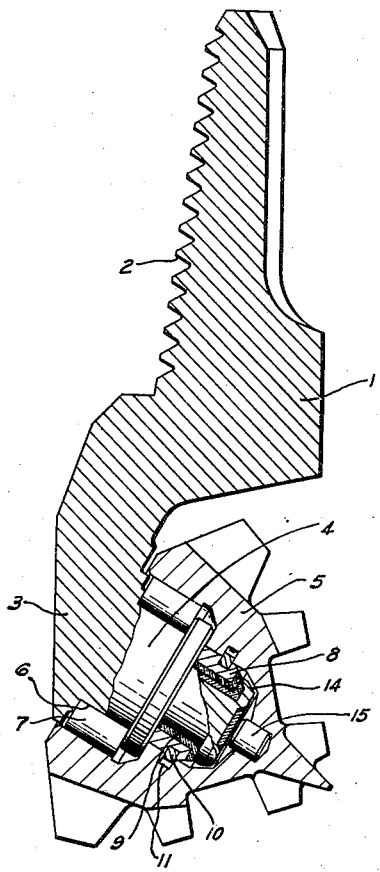

In the drawing, Fig. 1 is a longitudinal section through one section of a bit head showing my improved means for attaching the cutter to its shaft.

Figure 2:
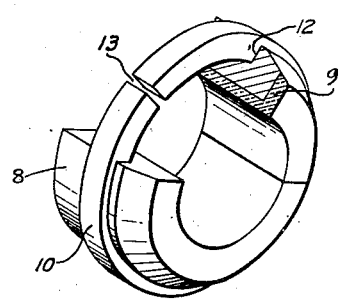

Fig. 2 is a broken perspective view of the bushing and the retaining ring thereon.

It is customary in the construction of cone bits to divide the head longitudinally into two or three sections each of which has a shaft and cutter thereon. In the drawing one of the sections of the bit head is shown at 1. The upper portion is threaded at 2 to engage with a drill collar. The lower end has a leg 3 upon which is formed a downwardly and inwardly inclined shaft 4. A cutter 5 is mounted to rotate on the shaft, said cutter being approximately conical in shape and surrounds and encloses the end of the shaft.

The shaft 4 has an annular groove 6 therein to receive a row of rollers 7. The forward portion of the shaft is reduced in diameter and formed with an annular recess or groove to receive a longitudinally split bushing 8. Said bushing is shown in Fig. 2. It may be faced with hard material which is welded upon its inner face and at the forward end as shown in Fig. 1, at 9. Also the bottom of the groove in the shaft may be hard faced to form a wear resisting bearing for the bushing by welding hard material thereon.

The cutter is secured to the bushing by means of a snap ring 10 which is of resilient material and split at one point, as shown at 13. It engages within a groove 12 in the bushing and within a groove 11 in the inner face of the cutter. The groove 11 is deep enough to receive the entire thickness of the ring so that the ring may be forced outwardly into the groove in the cutter when the cutter is moved upwardly over the beveled end 14 of the shaft. When the cutter is fitted completely over the shaft the ring 10 will spring inwardly into the recess 12 in the bushing and thus lock the cutter upon the bushing.

Thus, as the bushing is split, it may first be placed in position in the recess on the shaft and the cutter will be forced tightly over the bushing until the snap ring 10 engages in the groove 12 of the bushing. Then the cutter and bushing will rotate together upon the shaft, with the hard faces thereof in rotatable contact with each other.

At the forward end of the shaft 4 a button 15 of hard steel is fitted within a cylindrical recess in the cutter to take up the end thrust of the cutter upon the shaft which also is hard faced.

It will be understood that drills of this character are not intended for reuse after the cutting teeth upon the cutter are worn out. The bearings must last only as long as the teeth. Hence the cutters do not have to be removed and no provision need be made for removing the snap ring from the bushing after it has been engaged therein. The cutter is thus easily and quickly mounted in position and a wear resisting bearing is provided by the rotation of the bushing 8 upon the hard faced area of the shaft.

What I claim is:

1. A bit head, a cutter shaft thereon, an annular recess in said shaft, a split bushing adapted to fit rotatably therein, an annular groove in the outer periphery of said bushing, a cutter shaped to engage about said shaft and bushing, an inner groove in said cutter adapted to register with the annular groove in said bushing, and a snap ring in said grooves to retain said cutter on said bushing.

2. A cutter formed to engage over and enclose the end of a cutter shaft, a bushing longitudinally divided to engage within an annular recess in said shaft, an annular groove in said bushing, said cutter having an inner groove adapted to register with said annular groove in said bushing and a snap ring adapted to be expanded into the groove in said cutter to be moved over said bushing and resiliently contract to tightly engage in said annular groove, and lock said cutter upon said bushing, said cutter fitting tightly upon said bushing to rotate therewith.

3. A cutter formed to engage over and enclose the end of a cutter shaft, a bushing longitudinally divided to engage within an annular recess in said shaft, an annular groove in said bushing, hard facing material upon the inner face of said bushing and on the walls of said recess in said shaft, said cutter having an inner groove adapted to register with said annular groove in said bushing and a snap ring adapted to be expanded into the groove in said cutter to be moved over said bushing and resiliently contract to tightly engage in said annular groove, and lock said cutter upon said bushing, said cutter fitting tightly upon said bushing to rotate therewith.

4. A cutter shaft having a bearing recess therein, a bushing formed to fit rotatably in said recess, a cutter shaped to fit over the end of said shaft and bushing and engage non-rotatably with said bushing, and a snap ring fitting within opposed grooves in said bushing and said cutter to prevent relative longitudinal movement of said cutter on said bushing and said shaft.

FLOYD L. SCOTT.